Patented Sept. 4, 1928.

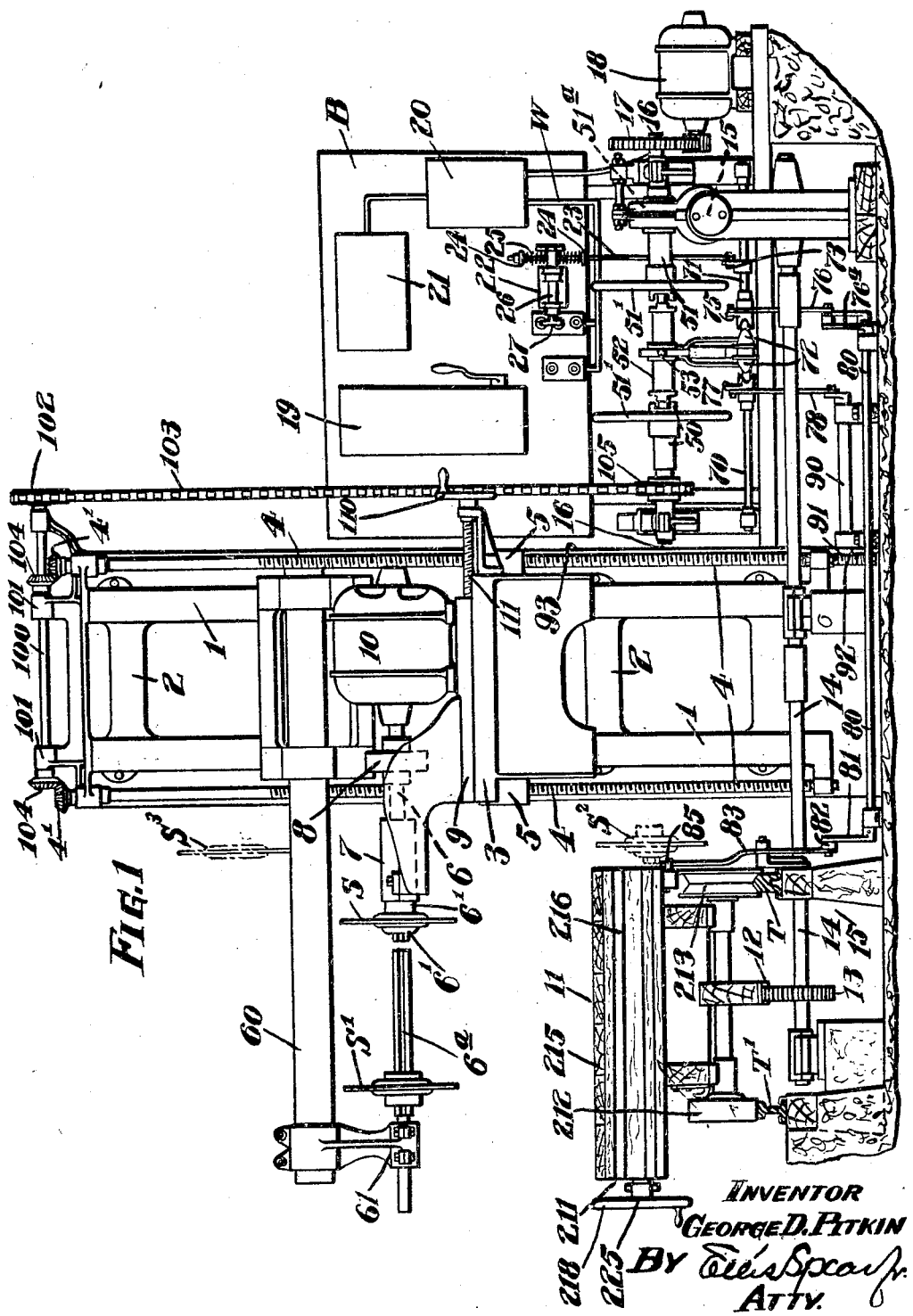

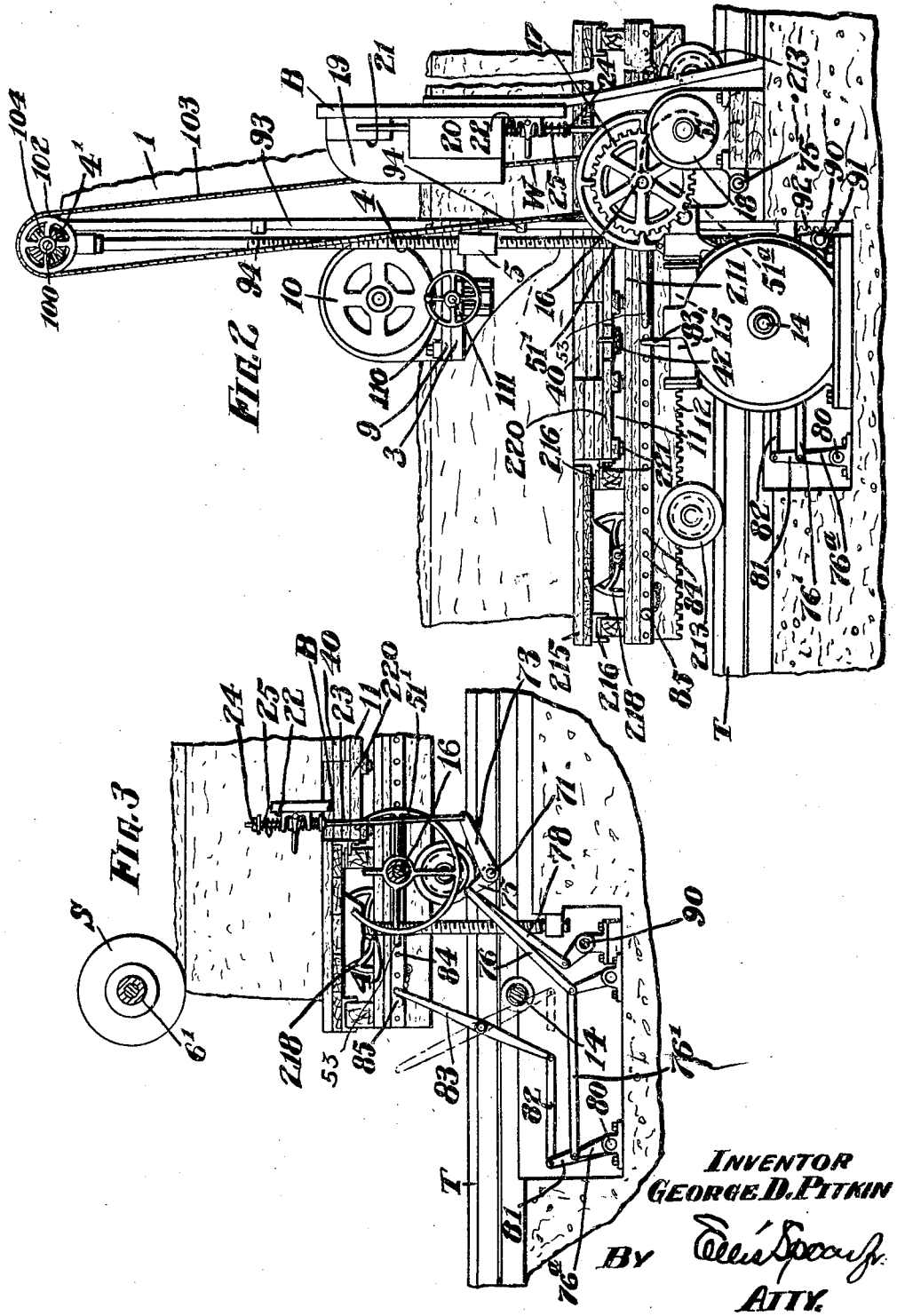

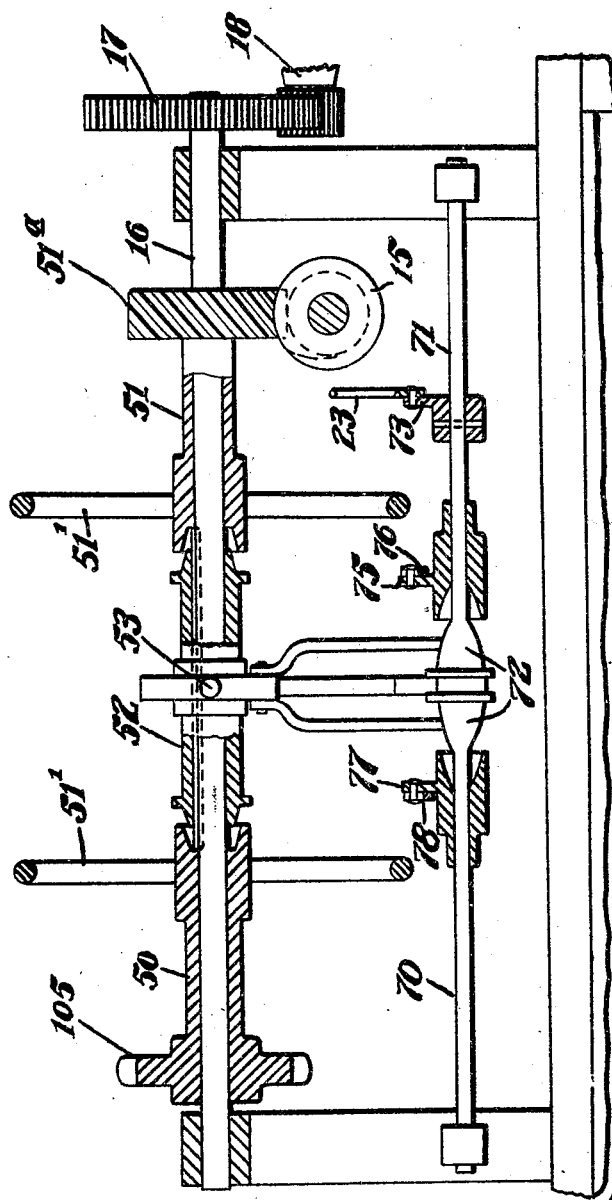

1,683,298

UNITED STATES PATENT OFFICE.

GEORGE D. PITKIN, OF MONTPELIER, VERMONT, ASSIGNOR TO LANE MANUFACTURING COMPANY, OF MONTPELIER, VERMONT, A CORPORATION OF VERMONT.

STONEWORKING MACHINE.

Application filed April 8, 1926. Serial No. 100,490.

In the present application there are presented certain improvements in stone working machines of the edging type. These may be briefly referred to as improvements in the traversing controls and in the control of the stone support, and in certain correlations of these whereby certain methods of operation are improved and speed and economy in the manufacture of stone are attained.

My invention is illustrated in an embodiment as shown in the accompanying drawings. This machine has been constructed and made available to the trade. It is capable of varied embodiment but I offer the said machine by way of illustration of my invention, as it is both illustrative and at the same time a commercially important embodiment.

Reverting immediately thereto, I show in the accompanying drawings the following views as illustrative thereof.

Fig. 1 is an end elevation of the machine selected.

Fig. 2 is a fragmentary side view of the carriage and abrading head.

Fig. 3 is a fragmentary view disclosing the carriage controls.

Fig. 4 is a detail view particularly showing the triple clutch and its operating mechanism.

The machine shown comprises uprights 1 cross braced as at 2 and forming a vertical support on which is slidably mounted the bed 3. This bed is fed by vertical feed screws 4 threaded into bearings 5. On the bed is slidably mounted a head slide 9 on which is journaled a saw arbor 6 and an overhanging bearing 7. The arbor 6 is coupled as at 8 to a motor 10 which drives it.

The stone table 11 is removably mounted on a carriage consisting of a frame 211 and supporting trucks 212 and 213. The latter is grooved and rides a V topped rail T while the former runs on an ordinary I-rail T'. The stone table has a longitudinal rack 12 engaged by a pinion 13 on a shaft 14 which is driven through a spiral gear 15 which takes its power from a shaft 16 geared at 17 to a motor 18. The motor 18 is a reversing motor which may be conveniently controlled by hand through the compensator 19 or automatically reversed by automatic switches of conventional type located in the boxes 20 and 21. The trip mechanism for these switches is indicated at 22 and will be more fully described later.

The bed 3 carries an extensible overhanging arm 60 having a bearing 61 in which the outer end of an extension shaft 6$^A$ is supported. This shaft has a keyway so that the extension saw S' can be adjusted relative to the main saw S. It will be noted that these saws overhang the trackway T on which the stone table is mounted.

Reverting to the stone table 11, which has been described as carried on supporting trucks 212 and 213 it will be seen that the entire table is detachable from the car frame 211.

The table itself comprises three sections; to wit, two end sections and a central section. The end sections comprise end slides 215 mounted on ways 216 elevated somewhat above the plane of the main table 11. The slides 215 are laterally adjusted by individual feed screws 217 controlled by hand wheels 218.

The saw is capable of performing the usual sawing operations but as illustrative of its points of advantage, the operation may be discussed in connection with an edging operation as the saw is rather unique in its ability to perform this operation without resetting of the stone. In such an operation the two main controls, i. e. those of the saw table and the saw head are operable alternately by power or hand. The controls for these feeds are as follows:

Feathered to the shaft 16 to turn therewith is the central member 52, of a triple clutch. The member 52 is slidable axially along the shaft 16 between the two loose sleeves 50 and 51 of the triple clutch, by means of a shipper lever 53 which also operates a clutch member 72, disposed between a pair of aligned rock shafts 70 and 71. The sleeve 50 carries a sprocket 105 for feeding the saw carriage vertically, and the sleeve 51 carries a spiral gear 51$^a$ for driving the stone table 11 longitudinally. Both sleeves 50 and 51 are provided with hand wheels 51' for controlling the depth of cut taken by the power-operated movement.

The rock shaft 71 is connected by an arm 73 with the push rod 23 for operating the reversing switches of the motor 18. The rod 23 carries a pair of spaced collars 24, between which is confined a coil spring 25, and is connected to the shaft 26 of the switch 27. The switch 27 may be of any conventional type and is cut in on one of the circuits W to the switches 20 and 21 on the switchboard B. Loosely mounted on the shaft 71 is an arm 75 which is connected by a link system 76, 76' to rocker arm 76ª on one end of a transversely extending rock shaft 80. The other end of said shaft 80 is provided with a rocker arm 81 which is connected by a link 82 to a tripping lever 83 pivoted in a bracket on the support of the trackway so that its upper end lies closely adjacent the path of travel of the inner edge of the table 11. This inner edge is provided with a series of holes 84 in which stop pins 85 may be set to give any desired length of traverse of the table on its track.

The shaft 70 has a loose arm 77 connected by a link 78 to a short rock shaft 90. The shaft 90 has a pinion 91 (Fig. 2) on one end engaging a rack member 92 on a vertical rod 93 at the edge of the saw head so that its traverse is vertically controlled, and the rod 93 carries a pair of spaced adjustable stops 94 for determining the vertical stroke of the saw carriage.

The screws 4 carry beveled pinions 4' at their upper ends which mesh with pinions 104 on a cross shaft 100 (Fig. 1) which has bearings at 101 on the frame 1 and is provided with a sprocket 102 driven by a silent chain 103 from the sprocket 105 carried by the loose sleeve 50 on the power shaft 16.

In operating the machine, after setting the stone as before described, the saw S is run down to the stone, the operator using the hand wheel 51' on the sleeve 50. Assuming now that the first cut is to be a longitudinal edging cut, the table 11 is put under its power control by throwing the lever 53 to the right (Fig. 1). This engages the sliding clutch member 52 with the loose member 51, so that the member 51 is now clutched to the power shaft 16 and the spiral gear 51ª will be rotated to drive the stone table 11 longitudinally by means of the operating connections 15, 14, 13 and 12. The table 11 is thus driven by power longitudinally relative to the saw bed 3. With the parts in this position, the hand wheel 51' on the opposite loose clutch member 50 is free to be used to control the depth of cut taken by the power-operating movement.

If the stop pins 85 have been properly positioned, the lever 83 will contact one or the other of them at each end of the longitudinal traverse of the stone table, whereby to rock the shaft 80. Inasmuch as the throw of the lever 53 has in the meantime connected the loose arm 75 of the shaft 71 to said shaft, the rocking motion of the shaft 80 will be transmitted through the connections 76 and 76ª to the arm 75, whereby to throw the switch 26 and thus reverse the motor 18 and the direction of travel of the stone table.

During the cutting operation and while the table is being reciprocated under automatic control, the saw can be adjusted vertically by the hand wheel 51' on the sleeve 50. Where a vertical cut is to be made, as at the end of the stone, the clutch lever 53 is shifted to the left in Fig. 1 to cause the central clutch 52 to engage the sleeve 50 which carries the sprocket 105, thereby clutching said sleeve to the shaft 16 and unclutching sleeve 51 so that the stone table will remain stationary. The shaft 100 is therefrom driven from sprocket 105 through chain 103 and drives the elevating screws 4 to raise and lower the saw table. The saw table is automatically reversed at either extreme of its vertical movement. For example, when the table reaches the limit of its downward stroke, the head engages the lower stop 94 on the slide rod 93 which through the rack and pinion 92, 91 rocks the shaft 90 and through the connections 78 and 77 rocks the shaft 70 which is now clutched to the shaft 71, thereby operating the reversing switch through the rod 23 as heretofore described.

When it is desired to saw the bottom of the block, the saw may be run down to the position indicated at S² and the block advanced over it. This makes it possible to saw entirely around the block. I have indicated in dotted lines at S³ an elevated position of the saw as these figures represent the substantial range of the saw.

The specific embodiment shown and thus described in detail represents a highly satisfactory commercial form of said machine but obviously various elements of the combinations involved in the machine may be omitted or modified, all without departing from the spirit of my invention if within the limits of the appended claims.

What I therefore claim and desire to secure by Letters Patent is:

1. In a stone working machine, a reversible driving source, an automatic reversing device therefor, a main shaft driven from said driving source, a pair of independent drives loosely mounted on said shaft, a clutch, a manually operable shipper lever for selectively shifting said clutch into engagement with either driver to couple the same to said main shaft, a countershaft operatively connected with said reversing device and with said clutch, a pair of ways, a stone table and a saw head respectively traversing said ways, a table feed adapted to be driven from one of said drivers on the main shaft, a head feed adapted to be driven from the other driver, a reversing mechanism for the table feed and an independently operating reversing mechanism for the head feed, and independent connections from said reversing mechanisms to said countershaft.

2. In a stone working machine, a reversible driving source, an automatic reversing device therefor, a main shaft driven from said driving source, a pair of independent drivers loosely mounted on said shaft, a clutch interposed between said drivers and feathered to said shaft for axial sliding movement therealong, a manually operable shipper lever for selectively shifting said clutch into engagement with either driver to couple the same to said main shaft, a pair of alined shafts operatively connected with said reversing device and with said clutch, a pair of ways, a stone table and a saw head respectively traversing said ways, a table feed adapted to be driven from one of said drivers on the main shaft, a head feed adapted to be driven from the other driver, a reversing mechanism for the table feed and an independently operating reversing mechanism for the head feed, and independent connections from said reversing mechanisms to said pair of alined shafts.

3. In a stone working machine, a reversible driving source, an automatic reversing device therefor, a main shaft driven from said driving source, a pair of independent drivers, a clutch for selectively coupling one or the other of said drivers to said shaft, a countershaft operatively connected with said reversing device and with said clutch, two ways, a stone table and a head respectively traversing said ways, reversible feeds for said table and head, independent reversing mechanisms for automatically changing the direction of feed of said table and head, respectively, and independent connections from said reversing mechanisms to said countershaft.

4. In a stone working machine, a pair of reversible feeds, a reversible driving source, an automatic reversing mechanism for each feed and an automatic reversing device for said driving source, a main shaft driven from said driving source, a pair of independent drivers loosely mounted on said shaft, a clutch, a manually operable shipper lever for selectively shifting said clutch into engagement with one or the other of said drivers, a countershaft operatively connected with said reversing device for the driving source and adapted to be coupled through said clutch with one or the other of said drivers, and operative connections from each of said feed reversing mechanisms to said countershaft.

5. In a stone working machine, a way, a stone table traversing said way, a table feed, a reversing mechanism for the table feed, a reversible driving source, an automatic reversing device therefor, a main shaft driven from said driving source, a driver loose on said shaft, a clutch for coupling said driver to said shaft, a countershaft coupled to said clutch and operatively connected with said reversing device for the driving source, and operative connections from said countershaft to said table feed reversing mechanism.

6. In a stone working machine, a way, a saw head traversing said way, a head feed, a reversing mechanism for the head feed, a reversible driving source, a reversing device therefor, a main shaft driven from said driving source, a driver loose on said shaft, a clutch for coupling said driver to said shaft, a countershaft coupled to said clutch and operatively connected with said reversing device for the driving source, and operative connections from said countershaft to said head feed reversing mechanism.

7. In a stone working machine, a reversible driving source, a reversing device therefor, a main shaft driven from said driving source, a pair of independent drivers, a clutch for selectively coupling one or the other of said drivers to said shaft, a countershaft operatively connected with said reversing device and with said clutch, two ways, a stone table and a head respectively, traversing said ways, reversible feeds for said table and head, independent reversing mechanisms for automatically changing the direction of feed of said table and head, respectively, including independent trips disposed for actuation by said table and head respectively as each approaches the limit of its travel in either direction, and independent connections from said reversing mechanisms to said countershaft for automatically shifting said clutch to reverse the drive of said table and head feeds.

8. In a stone working machine, a reversible driving source, an automatic reversing device therefor, a main shaft driven from said driving source, a pair of spaced clutch sleeves loose on said shaft and an interposed sliding clutch member selectively engageable with either sleeve, a shipper lever for shifting said clutch member, a pair of independent alined shafts operatively connected with said sliding clutch member and with said reversing device, a pair of ways, a stone table and a saw head respectively traversing said ways, a feed for said table driven from one of said clutch sleeves and a feed for said head driven from the other clutch sleeve, a trip lever disposed for actuation by said table as it approaches either limit of its travel, a rock shaft carrying said trip lever and operatively connected to one of said pair of alined shafts, a trip adapted for actuation by said head as it approaches either limit of its travel, and operative connections from said last named trip to the other of said pair of alined shafts.

In testimony whereof I affix my signature.

GEORGE D. PITKIN.